United States Patent [19]

Vesely

[11] 3,846,501

[45] Nov. 5, 1974

[54] PREPARATION OF ALKOXY SUBSTITUTED HYDROXY AROMATIC COMPOUNDS

[75] Inventor: Jerome A. Vesely, Park Ridge, Ill.

[73] Assignee: Universal Oil Products Company, Des Plaines, Ill.

[22] Filed: Aug. 31, 1972

[21] Appl. No.: 285,162

[52] U.S. Cl.............................................. 260/613 D
[51] Int. Cl............................................ C07c 43/20
[58] Field of Search......... 260/613 D, 612 D, 621 G

[56] References Cited
UNITED STATES PATENTS

| 3,453,332 | 7/1969 | Vesely | 260/621 G |
| 3,481,989 | 12/1969 | Vesely | 260/613 D |
| 3,662,005 | 5/1972 | Hervert | 260/613 D |

Primary Examiner—Bernard Helfin
Assistant Examiner—Nicky Chan
Attorney, Agent, or Firm—James R. Hoatson, Jr.; Raymond H. Nelson; William H. Page, II

[57] ABSTRACT

Alkoxy substituted hydroxy aromatic compounds may be prepared by reacting a hydroxy aromatic compound with an alcohol and hydrogen peroxide in the presence of a catalyst system comprising hydrogen fluoride and carbon dioxide.

8 Claims, No Drawings

PREPARATION OF ALKOXY SUBSTITUTED HYDROXY AROMATIC COMPOUNDS

This invention relates to a process for the preparation of alkoxy substituted hydroxy aromatic compounds. More particularly, the invention is concerned with a process in which a hydroxy aromatic compound is reacted with an alcohol in hydrogen peroxide in the presence of a certain catalyst system to prepare alkoxy substituted hydroxy aromatic compounds.

Alkoxy substituted hydroxy aromatic compounds which are prepared according to the process of this invention will find a wide variety of uses in the chemical industry. For example, guaiacol (ortho-methoxyphenol) which may be prepared by reacting hydrogen peroxide and methyl alcohol with phenol is used in medicine as well as an intermediate in the preparation of catechol and guaiacol compounds. Likewise hydroquinone monomethyl ether (para-methoxyphenol) which also results from the reaction of phenol with hydrogen peroxide and methyl alcohol is used in the manufacture of antioxidants, pharmaceuticals, plasticizers, and dyestuffs; as a stabilizer for chlorinated hydrocarbons and ethyl cellulose; as an inhibitor for acrylic monomers and acrylonitriles, and as an ultra-violet inhibitor. Other alkoxy substituted hydroxy aromatic compounds will find corresponding uses in the chemical field.

It is therefore an object of this invention to provide a process for preparing alkoxy substituted hydroxy aromatic compounds.

A further object of this invention is to react a hydroxy aromatic compound with an aliphatic alcohol in the presence of certain catalyst systems to prepare alkoxy substituted hydroxy aromatic compounds.

In one aspect an embodiment of this invention resides in a process for the preparation of an alkoxy substituted hydroxy aromatic compound which comprises reacting a hydroxy aromatic compound with hydrogen peroxide and an aliphatic alcohol in the presence of hydrogen fluoride and carbon dioxide at reaction conditions, and recovering the resultant alkoxy substituted hydroxy aromatic compound.

A specific embodiment of this invention is found in a process for the preparation of an alkoxy substituted hydroxy aromatic compound which comprises reacting hydroquinone with hydrogen peroxide and methyl alcohol in the presence of hydrogen fluoride and carbon dioxide at a temperature in the range of from 0° to about 50° C. and recovering the resultant p-hydroxyanisole.

Other objects and embodiments will be found in the following further detailed description of the present invention.

As hereinbefore set forth the present invention is concerned with a process for the preparation of alkoxy substituted hydroxy aromatic compounds, the process consisting in reacting a hydroxy aromatic compound with an aliphatic alcohol and a hydrogen peroxide in the presence of a catalyst system consisting of hydrogen fluoride and carbon dioxide. Heretofore, it has been known that hydrogen fluoride alone does not catalyze an interaction of aromatic compounds, including hydroxy or polyhydroxy aromatic compounds, with methyl alcohol at relatively low temperatures. However, it has not been unexpectedly discovered that when using a catalyst system consisting of hydrogen fluoride and carbon dioxide it is possible to interact the alcohol with the hydroxy aromatic compound in the presence of hydrogen peroxide to form alkoxy substituted hydroxy aromatic compounds, the reaction being effected at relatively low temperatures. Therefore, it is possible to prepare the desired products by utilizing relatively inexpensive reaction equipment, the need for expensive heating means being obviated in view of the relatively low reaction temperatures at which said reaction is effected. As will be hereinafter shown in greater detail, significant amounts of the desired product may be obtained when utilizing the aforesaid catalyst system as compared to the amounts of desired product which are obtained when effecting the reaction in the presence of a catalyst consisting only of hydrogen fluoride.

Suitable hydroxy aromatic compounds which may be reacted with an alcohol according to the process hereinafter set forth in greater detail will include phenol, o-cresol, m-cresol, p-cresol, o-ethylphenol, m-ethylphenol, p-ethylphenol, o-propylphenol, m-propylphenol, p-propylphenol, o-butylphenol, m-butylphenol, p-butylphenol, 1-naphthol, 2-naphthol, 2-methyl-1-naphthol, 2-ethyl-1-naphthol, 2-propyl-1-naphthol, 2-butyl-1-naphthol, 4-methyl-1-naphthol, 4-ethyl-1-naphthol, 4-propyl-1-naphthol, 4-butyl-1-naphthol, 4-methyl-2naphthol, 4-ethyl-2-naphthol, 4-propyl-2-naphthol, 4-butyl-2-naphthol, 5-methyl-2-naphthol, 5-ethyl-2-naphthol, 5-propyl-2-naphthol, 5-butyl-2-naphthol, etc., polyhydroxy aromatic compounds such as pyrocatechin, resorcinol, hydroquinone, hydroxyhydroquinone, phloroglucinol, pyrogallol, 1,2-dihydroxynaphthalene, 1,3-dihydroxynaphthalene, 1,4-dihydroxynaphthalene, 2,5-dihydroxynaphthalene, etc.

Examples of aliphatic alcohols which are reacted with the aforementioned hydroxy aromatic compounds will include in particular primary aliphatic alcohols containing from one to about nine carbon atoms such as methyl alcohol, ethyl alcohol, n-propyl alcohol, isopropyl alcohol, n-butyl alcohol, sec-butyl alcohol, t-butyl alcohol, the isomeric pentyl, hexyl, heptyl, octyl and nonyl alcohols, etc. The reaction of the aforementioned primary aliphatic alcohols and hydroxy aromatic compounds is effected at relatively low temperatures, said temperatures being in the range of from about 0° to about 50° C. and preferably in a range of from about 0° to about 30° C. The reaction between the hydroxy aromatic compound and the aliphatic alcohol is effected in the presence of hydrogen peroxide and a catalyst comprising a hydrogen fluoride-carbon dioxide complex. As hereinbefore set forth, by utilizing this particular catalyst complex, it is possible to alkoxylate a hydroxy aromatic compound by utilizing an aliphatic alcohol at a relatively low temperature. The catalyst complex will usually consist of the mixture of the hydrogen fluoride and carbon dioxide in which the carbon dioxide is present in a range of from about 15 to 50 weight percent of the catalyst phase. In addition, the hydrogen peroxide which is utilized in the process of the present invention may be present in an aqueous solution containing from 5 up to about 90 percent or more of hydrogen peroxide. The preferred hydrogen peroxide solution will contain a 30 to 50 percent or higher concentration of hydrogen peroxide inasmuch as, when utilizing a lesser amount of the aqueous portion of the solution, will tend to dilute the catalyst which is preferably charged to the reaction zone in anhydrous form. When the concentration of hydrogen fluoride in the catalyst complex falls below a figure of about 60 to 70 percent the reaction will slow down and eventually cease. Therefore, it is necessary to maintain the concentration of hydrogen fluoride in an amount greater than 60 percent and preferably greater than 80 percent, thus necessitating the use of a relatively concentrated hydrogen peroxide solution. It is also contemplated within the scope of this invention that, if so desired, an additional compound such as boron trifluoride or ferrous fluoroborate having the formula: $FeF_2.BF_3$ may be utilized as a promoter to increase the catalytic activity and thereby permit the reaction to proceed in such a manner as to provide increased yields of the desired product. As hereinbefore set forth reaction conditions will include temperatures ranging from about 0° to about 50° C. and a pressure which will range from ambient up to about 100 atmospheres, the superatmospheric pressure being afforded by the introduction of the carbon dioxide into the reaction vessel.

The process of the present invention may be effected in any suitable manner and may comprise either a batch or continuous type operation. For example, when a batch type operation is used a quantity of the hydroxy aromatic compound which is to be reacted with the alcohol is placed in an appropriate apparatus such as, for example, a stirred or rotating autoclave. In addition, the aliphatic alcohol is also placed in the autoclave, the reactants being present in a mole ratio of from about 1:1 to about 5:1 moles of alcohol per mole of hydroxy aromatic compound. The autoclave is then heated or cooled to the desired temperature and maintained thereat during the reaction period which may range from 0.5 hours up to about 20 hours or more in duration. The hydrogen fluoride is then pressured into the autoclave followed by the addition of the carbon dioxide, the carbon dioxide being pressed in until the desired weight percent of the catalyst complex has been reached. The hydrogen peroxide is thereafter added under controlled conditions and the reaction is allowed to proceed for the predetermined residence time. It has also been discovered that, by utilizing the carbon dioxide as a component of the catalyst system in the present reaction, another advantage is present in that said carbon dioxide will act as an internal coolant thereby allowing the hydrogen peroxide to be added to the reaction mixture during a shorter period without having a corresponding sharp and contained rise in the reaction temperature occur. Upon completion of the desired residence time the excess pressure is vented and the catalyst is purged from the reactor by utilizing a stream of inert gas such as nitrogen as the purging agent. The reaction mixture is recovered from the reactor and subjected to conventional means for recovery of the desired product, said means include washing the mixture with an inert organic solvent, neutralizing any hydrogen fluoride which still may be present, flashing off the solvent and subjecting the reaction mixture to fractional distillation, fractional crystallization, etc., to recover the desired alkoxy substituted hydroxy aromatic compound.

It is also contemplated within the scope of this invention that the process described herein may be effected in a continuous manner of operation. When such a type of operation is used, the aromatic acid is continuously charged to a reaction zone which is maintained at the proper operating conditions of temperature and pressure. The hydrogen fluoride-carbon dioxide catalyst complex is also continuously charged to the reaction zone as is the hydrogen peroxide in the form of an aqueous solution containing from 5 percent to about 90 percent or more hydrogen peroxide. As hereinbefore set forth the carbon dioxide will be present in the reaction zone in an amount ranging from about 15 percent to about 50 percent by weight of the catalyst complex thereby permitting the addition of the hydrogen peroxide to be effected in a shorter period of time without a corresponding increase in the reaction temperature. At the end of a predetermined residence time, the reactor effluent is continuously withdrawn from the reactor and subjected to treatment similar to that hereinbefore set forth to recover the desired alkoxy substituted hydroxy aromatic compounds.

Examples of alkoxy substituted hydroxy aromatic compounds which may be prepared according to the process of this invention will include o-methoxyphenol, m-methoxyphenol, p-methoxyphenol, o-ethoxyphenol, m-ethoxyphenol, p-ethoxyphenol, o-propoxyphenol, m-propoxyphenol, p-propoxyphenol, o-butoxyphenol, m-butoxyphenol, p-butoxyphenol, 3-methoxy-o-cresol, 4-methoxy-o-cresol, 5-methoxy-o-cresol, 6-methoxy-o-cresol, 3-ethoxy-o-cresol, 4-ethoxy-o-cresol, 5-ethoxy-o-cresol, 6-ethoxyo-o-cresol, 3-propoxy-o-cresol, 4-propoxy-o-cresol, 5-propoxy-o-cresol, 6-propoxy-o-cresol, 2-methoxy-m-cresol, 4-methoxy-m-cresol, 5-methoxy-m-cresol, 6-methoxy-m-cresol, 2-ethoxy-m-cresol, 4-ethoxy-m-cresol, 5-ethoxy-m-cresol, 6-ethoxy-m-cresol, 2propoxy-m-cresol, 4-propoxy-m-cresol, 5-propoxy-m-cresol, 6-proxy-m-cresol, 2-methoxy-p-cresol, 3-methoxy-p-cresol, 2-ethoxy-p-cresol, 3-ethoxy-p-cresol, 2-propoxy-p-cresol, 3-propoxy-p-cresol, o-hydroxyanisole, m-hydroxyanisole, p-hydroxyanisole, 2-methoxy-1-naphthol, 2-ethoxy-1-naphthol, 2-propoxy-1-naphthol, 3-methoxy-1-naphthol, 3-ethoxy-1-naphthol, 3-propoxy-1-naphthol, 4-methoxy-1-naphthol, 4-ethoxy-1-naphthol, 4-propoxy-1-naphthol, 3-methoxypyrocatechin, 3-ethoxypyrocatechin, 4-methoxypyrocatechin, 4-ethoxypyrocatechin, 2-methoxyresorcinol, 2-ethoxyresorcinol, 2-propoxyresorcinol, 4-methoxyresorcinol, 4-ethoxyresorcinol, 4-propoxyresorcinol, methoxyhydroquinone, ethoxyhydroquinone, propoxyhydroquinone, etc. It is to be understood that the aforementioned alkoxy substituted hydroxy aromatic compounds are only representative of the class of compounds which may be prepared, and that the present invention is not necessarily limited thereto.

The following examples are given to illustrate the process of the present invention which, however, are not intended to limit the generally broad scope of the present invention in strict accordance therewith.

EXAMPLE I

To the glass liner of a stainless steel turbomixer autoclave was added 165 g. (1.5 mole) of hydroquinone and 157 g. (4.9 mole) of methyl alcohol. Following this 452 g. (22.6 mole) of hydrogen fluoride was charged thereto. A sufficient amount of carbon dioxide which corresponded to 18.4 weight percent of the catalyst phase was added and thereafter 0.19 mole of a 30 percent hydrogen peroxide solution was gradually added to the reactor during a period of 23 minutes, said reactor being maintained at a temperature of about 0° C. by means of an ice bath. The resulting mixture was stirred for an additional period of 20 minutes while maintaining the autoclave at the above temperature. After a total contact time of 43 minutes had passed, the excess pressure was vented and the hydrogen fluoride was swept out of the autoclave with a stream of nitrogen for a period of about 2 hours before the autoclave was opened. The reaction product was transferred to a beaker and the reactor parts were washed with benzene, the washings being added to the reaction product. The solution was decanted into another beaker thereby separating out a small amount of an aqueous phase which contained some benzene insoluble product. The decanted benzene solution was treated with calcium carbonate to remove residual hydrogen fluoride, filtered under suction and distilled to remove benzene and unreacted hydroquinone. The benzene insoluble product was combined with the product in the aqueous acid phase and extracted with n-pentane. On cooling, pearlescent crystalline flakes which had a melting point of 55°–65° C. separated out. The crystalline flakes were analyzed by means of infra-red and gas-liquid chromatography, said analyses disclosing that the flakes were pure p-hydroxyanisole.

EXAMPLE II

In this example 324 g. (3.0 mole) of p-cresol and 78 g. (2.4 mole) of methyl alcohol were placed in a stainless steel turbomixer autoclave. The autoclave was sealed and 232 g. (11.6 mole) of hydrogen fluoride was charged thereto. Thereafter carbon dioxide in an amount sufficient to obtain a 30 weight percent carbon dioxide content of the catalyst phase was added and 34 g. (0.29 mole) of a 30 percent hydrogen peroxide solution was gradually added to the reactor during a period of 28 minutes, the reactor being maintained at a temperature ranging from about 0° to about 9° C. by means of an ice bath. The resulting mixture was stirred for an additional period of 10 minutes while maintaining the temperature of the autoclave in the aforementioned range. After a total contact time of 38 minutes had passed, the excess pressure was vented and hydrogen fluoride was swept out of the autoclave with a stream of nitrogen for a period of about 2 hours before the autoclave was opened.

The reaction product was recovered and treated in a manner similar to that set forth in Example I, that is, by transferring the product to a beaker, washing the autoclave parts with benzene and combining the washings with the product. The solution was treated with calcium carbonate to remove residual hydrogen fluoride, filtered and distilled to remove the methyl alcohol and benzene. Again the total hydrogen fluoride free and almost methyl alcohol free product was extracted with n-pentane to remove the remaining alcohol. Nuclear magnetic resonance of the product along with infra-red analysis disclosed the presence of 2-methyl-4-methoxyphenol having a melting point of 69° C. This corresponded to a melting point for 2-methyl-4-methoxyphenol of 70.5°–71.5° C. as disclosed in the literature. In addition, smaller amounts of other isomeric methoxy cresols were also found to be present.

EXAMPLE III

To a stainless steel turbomixer autoclave is added a mixture of 188 g. (2.0 mole) of phenol and 160 g. (5.0 mole) of methyl alcohol. To the mixture is charged 240 g. (12.0 mole) of hydrogen fluoride and a sufficient amount of carbon dioxide so that the amount present corresponded to a 30 weight percent of the catalyst phase. The autoclave is cooled to a temperature of 0° C. by means of an ice bath, following which 0.29 mole of a 30 percent hydrogen peroxide solution is slowly added for a period of 20 minutes. During the addition period and for a subsequent 15 minute additional stirring time, the temperature of the autoclave is maintained at 0° C. Upon completion of the total residence time, the excess pressure is discharged and the hydrogen fluoride is swept out of the autoclave by means of a stream of nitrogen passing therethrough for a period of 2 hours.

After opening the autoclave the product is transferred to a beaker and the reactor parts are washed with benzene, the reaction product being combined with the washings. Upon decanting the reaction product into a second beaker some benzene insoluble product is separated out. The decanted benzene solution is treated to remove residual hydrogen fluoride, filtered under suction and subjected to distillation. The bottoms are extracted with n-pentane and the extract concentrated over steam. Upon cooling, the desired product which comprises a mixture of isomeric methoxyphenols is recovered.

EXAMPLE IV

To a stainless steel turbomixer autoclave is added a mixture of 144 g. (1.0 mole) of 1-naphthol and 138 g. (3.0 mole) of ethyl alcohol. The autoclave is sealed, following which 232 g. (11.6 mole) of hydrogen fluoride and 92 g. of carbon dioxide are added. The autoclave is cooled to a temperature of 0° C. by means of an ice bath following which 0.14 mole of a 30 percent hydrogen peroxide solution is slowly added during a period of 20 minutes. During the 20-minute addition period and for an additional 20-minute period during which time continuous stirring is effected, the temperature of the autoclave is maintained at about 0° C. Upon completion of the 40-minute total contact time, the excess pressure is vented and a stream of nitrogen is pressed through the autoclave for a period of 2 hours in order to sweep out all hydrogen fluoride.

After opening the autoclave, the product is treated in a manner similar to that set forth in the above examples whereby the desired alkoxy substituted hydroxy aromatic compound comprising an isomeric mixture of ethoxynaphthols is recovered.

EXAMPLE V

To a stainless steel turbomixer autoclave is charged 220 g. (2.0 mole) of resorcinol and 230 g. (5.0 mole) of ethyl alcohol. The autoclave is sealed, following which 215 g. (10.8 mole) of hydrogen fluoride and 92 g. of carbon dioxide corresponding to a 30 weight percent of the catalyst phase are also added. Thereafter 16.4 g. of a 30 percent hydrogen peroxide solution is slowly added to the mixture during a period of about 30 minutes. During the 30-minute addition period and for an additional stirring time of 15 minutes, the temperature of the autoclave and contents thereof is maintained in a range of from about 0° to about 3° C. by means of an ice bath. At the end of the 45-minute total contact period, the hydrogen fluoride is purged from the autoclave by means of a stream of nitrogen, said purge being effected during a 2-hour period.

The reaction mixture, after opening the autoclave, is treated in a manner similar to that set forth in the above examples, whereby the desired product comprising an isomeric mixture of ethoxyresorcinols recrystallized from n-pentane.

I claim as my invention:

1. A process for the preparation of an alkoxy substituted hydroxy aromatic compound which comprises contacting hydrogen peroxide and a primary aliphatic alcohol of from one to about nine carbon atoms with a hydroxy aromatic compound selected from the group consisting of phenol, naphthol, alkyl phenols and naphthol containing one to four carbon atoms in the alkyl group, pyrocatechin, resorcinol, hydroquinone, hydroxyhydroquinone, phloroglucinol, pyrogallol, 1,2-dihydroxynaphthalene, 1,3-dihydroxynaphthalene, 1,4-dihydroxynaphthalene, and 2,5-dihydroxynaphthalene, said compounds being contacted at a temperature of from about 0° to about 50°C. and a pressure of from ambient to about 100 atmospheres and in the presence of a catalytic amount of a mixture consisting essentially of more than 60 percent hydrogen fluoride and at least about 15 weight percent of carbon dioxide.

2. The process as set forth in claim 1 in which said alcohol is methyl alcohol.

3. The process as set forth in claim 1 in which said alcohol is ethyl alcohol.

4. The process as set forth in claim 1 in which said hydroxy aromatic compound is phenol, said alcohol is methyl alcohol and said alkoxy substituted hydroxy aromatic compound is a mixture of methoxyphenols.

5. The process as set forth in claim 1 in which said hydroxy aromatic compound is p-cresol, said alcohol is methyl alcohol and said alkoxy substituted hydroxy aromatic compound is a mixture of methoxycresols.

6. The process as set forth in claim 1 in which said hydroxy aromatic compound is hydroquinone, said alcohol is methyl alcohol and said alkoxy substituted hydroxy aromatic compound is p-hydroxyanisole.

7. The process as set forth in claim 1 in which said hydroxy aromatic compound is 1-naphthol, said alcohol is ethyl alcohol and said alkoxy substituted hydroxy aromatic compound is a mixture of ethoxynaphthols.

8. The process as set forth in claim 1 in which said hydroxy aromatic compound is resorcinol, said alcohol is ethyl alcohol and said alkoxy substituted hydroxy aromatic compound is a mixture of ethoxyresorcinols.

* * * * *